US012609319B2

(12) United States Patent
Kato et al.

(10) Patent No.: US 12,609,319 B2
(45) Date of Patent: Apr. 21, 2026

(54) NEGATIVE ELECTRODE

(71) Applicant: TOYOTA JIDOSHA KABUSHIKI KAISHA, Toyota (JP)

(72) Inventors: Masaki Kato, Toyota (JP); Koji Takahata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/389,965

(22) Filed: Dec. 20, 2023

(65) Prior Publication Data

US 2024/0120484 A1     Apr. 11, 2024

Related U.S. Application Data

(63) Continuation of application No. 17/865,466, filed on Jul. 15, 2022, now Pat. No. 12,519,111, which is a
(Continued)

(30) Foreign Application Priority Data

Jan. 15, 2019     (JP) ................................. 2019-004653

(51) Int. Cl.
*H01M 4/62*          (2006.01)
*H01M 4/02*          (2006.01)
(Continued)

(52) U.S. Cl.
CPC ............. *H01M 4/62* (2013.01); *H01M 4/133* (2013.01); *H01M 4/362* (2013.01); *H01M 4/587* (2013.01);
(Continued)

(58) Field of Classification Search
CPC ........ H01M 4/62; H01M 4/133; H01M 4/362; H01M 4/587; H01M 10/0525; H01M 2004/027
See application file for complete search history.

(56) References Cited

U.S. PATENT DOCUMENTS 6,268,086 B1     7/2001  Honbo
2009/0136849 A1     5/2009  Yue et al.
(Continued)

FOREIGN PATENT DOCUMENTS

CN          1697215 A     11/2005
DE          10115455 B4     9/2005
(Continued)

OTHER PUBLICATIONS

JP-2001291516-A English machine translation (Year: 2024).*
JP-2004296181-A English machine translation (Year: 2025).*

*Primary Examiner* — Armindo Carvalho, Jr.
(74) *Attorney, Agent, or Firm* — Dinsmore & Shohl LLP

(57)          ABSTRACT

Provided is a negative electrode in which during manufacture thereof a negative electrode paste has an appropriate viscosity, and which is capable of preventing an increase in resistance of a battery when left at a high temperature for a long period of time. A negative electrode disclosed herein includes a negative electrode current collector, and a negative electrode active material layer supported by the negative electrode current collector. The negative electrode active material layer contains a negative electrode active material, and a trace component. The trace component is at least one element selected from the group consisting of Ti, Si, Ca, and Cr. The content of the trace component is not less than 10 mass ppm and not more than 800 mass ppm with respect to the negative electrode active material.

6 Claims, 2 Drawing Sheets

Related U.S. Application Data continuation of application No. 16/741,329, filed on Jan. 13, 2020, now Pat. No. 12,424,629.

(51) Int. Cl.

| | | |
|---|---|---|
| *H01M 4/133* | (2010.01) | |
| *H01M 4/36* | (2006.01) | |
| *H01M 4/587* | (2010.01) | |
| *H01M 10/0525* | (2010.01) | |

(52) U.S. Cl.

CPC .. *H01M 10/0525* (2013.01); *H01M 2004/027* (2013.01)

(56) References Cited

U.S. PATENT DOCUMENTS

| | | | | |
|---|---|---|---|---|
| 2011/0159375 | A1 * | 6/2011 | Feaver | H01G 11/34 |
| | | | | 429/204 |
| 2014/0134492 | A1 | 5/2014 | Yamami et al. | |
| 2016/0111718 | A1 | 4/2016 | Figgemeier | |
| 2018/0151873 | A1 | 5/2018 | Matsuno et al. | |
| 2018/0226683 | A1 * | 8/2018 | Nohara | H01M 10/0567 |
| 2021/0167391 | A1 * | 6/2021 | Jo | H01M 4/134 |

FOREIGN PATENT DOCUMENTS

| | | | | | |
|---|---|---|---|---|---|
| JP | 2001291516 | A | * | 10/2001 | C01B 32/20 |
| JP | 2004296181 | A | * | 10/2004 | |
| JP | 2013-045714 | A | | 3/2013 | |
| JP | 2013-246992 | A | | 12/2013 | |
| JP | 2015170542 | A | | 9/2015 | |
| JP | 2016024984 | A | | 2/2016 | |
| JP | 2016225199 | A | | 12/2016 | |
| KR | 20180014710 | A | | 2/2018 | |
| WO | 2013002162 | A1 | | 1/2013 | |

* cited by examiner

NEGATIVE ELECTRODE

CROSS-REFERENCE TO RELATED APPLICATIONS

This application is a continuation application of co-pending U.S. patent application Ser. No. 17/865,466 filed on Jul. 15, 2022, which is a continuation application of U.S. patent application Ser. No. 16/741,329, filed on Jan. 13, 2020, entitled NEGATIVE ELECTRODE, which claims priority to Japanese Patent Application No. 2019-004653 filed on Jan. 15, 2019, the entire disclosure of which is hereby incorporated by reference.

TECHNICAL FIELD

The present teaching relates to a negative electrode.

TECHNICAL BACKGROUND

In recent years, batteries such as a lithium secondary battery and the like are suitably used as a portable power source for a personal computer or a mobile terminal, and a power source for driving a vehicle such as an electric vehicle (EV), a hybrid vehicle (HV), or a plug-in hybrid vehicle (PHV).

A negative electrode of a typical battery, particularly a negative electrode of a lithium secondary battery commonly has a configuration in which a negative electrode active material layer containing a negative electrode active material is supported by a negative electrode current collector.

Ongoing needs exist for further increasing the performance of the lithium secondary battery as a result of its widespread use. Higher performance has been achieved by improving the negative electrode. As an example, WO 2013/002162 discloses that, in order to improve cycle characteristics of a nonaqueous electrolyte secondary battery, a flake graphite particle and a coated graphite particle obtained by coating a surface of a graphite particle with a coating layer containing an amorphous carbon particle and an amorphous carbon layer are used as the negative electrode active materials.

SUMMARY

As a result of elaborate studies conducted by the present inventors, it has been found that, in the conventional art, a problem arises in that resistance increases in the case where a battery is left at a high temperature for a long period of time. In addition, when the negative electrode is produced by using a negative electrode paste containing the negative electrode active material, from the viewpoint of productivity, the viscosity of the paste is within an appropriate range without becoming extremely high.

To cope with this, an object of the present teaching is to provide a negative electrode in which during manufacture thereof a negative electrode paste has an appropriate viscosity, and which is capable of preventing an increase in resistance of a battery when left at a high temperature for a long period of time.

The present inventors have attempted to add various elements to the negative electrode active material layer in order to improve the negative electrode. As a result, it has been found that it is possible to prevent an increase in resistance of a battery when left at a high temperature for a long period of time in the case where the negative electrode active material layer contains a specific amount of a specific element. In addition, it has been found that the viscosity of the negative electrode paste containing the negative electrode active material has an appropriate value during manufacture of the negative electrode active material layer in the case where the negative electrode active material layer contains the specific amount of the specific element.

That is, a negative electrode disclosed herein includes a negative electrode current collector, and a negative electrode active material layer supported by the negative electrode current collector. The negative electrode active material layer contains a negative electrode active material and a trace component. The trace component is at least one element selected from the group consisting of Ti, Si, Ca, and Cr. The content of the trace component is not less than 10 mass ppm and not more than 800 mass ppm with respect to the negative electrode active material.

According to such a configuration, there is provided a negative electrode in which during manufacture thereof a negative electrode paste has an appropriate viscosity, and which is capable of preventing an increase in resistance of a battery when left at a high temperature for a long period of time.

In the negative electrode disclosed herein, the negative electrode active material is graphite in embodiments.

The negative electrode disclosed herein is a negative electrode of a lithium secondary battery in embodiments.

DETAILED DESCRIPTION

Figure 1:
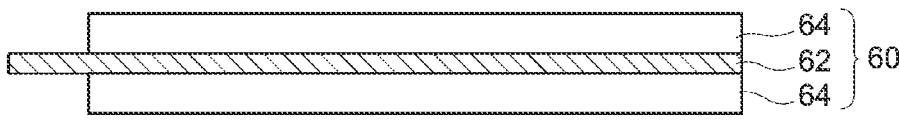
FIG. 1 is a cross-sectional view schematically showing a negative electrode according to an embodiment of the present teaching.

Hereinbelow, an embodiment according to the present teaching will be described with reference to the drawings. It should be noted that any features other than matters specifically mentioned in the present specification and that may be necessary for carrying out the present teaching (for example, the general configuration of the negative electrode and manufacturing process thereof which do not characterize the present teaching) can be understood as design matters for a person skilled in the art which are based on the related art. The present teaching can be implemented based on contents disclosed in the present specification and common general technical knowledge in the related art. In addition, in the following drawings, members and portions which have the same functions are designated by the same reference numerals. Further, the dimensional relationship (length, width, thickness, and the like) in the individual drawings may not necessarily reflect the actual dimensional relationship.

FIG. 1 is a cross-sectional view schematically showing a negative electrode according to the present embodiment, and is a cross-sectional view perpendicular to a thickness direction.

A negative electrode 60 according to the present embodiment shown in FIG. 1 is a negative electrode of a lithium secondary battery.

In the present specification, the "secondary battery" denotes a storage device which can be charged and discharged repeatedly, and is a term which includes power storage elements such as a so-called storage battery and an electric double-layer capacitor.

In addition, in the present specification, the "lithium secondary battery" denotes a secondary battery in which a lithium ion is used as a charge carrier, and charge and discharge are implemented by movement of an electric charge carried by the lithium ion between positive and negative electrodes.

As shown in the drawing, the negative electrode 60 includes a negative electrode current collector 62, and a negative electrode active material layer 64 supported by the negative electrode current collector 62. Specifically, the negative electrode 60 includes the negative electrode current collector 62, and the negative electrode active material layer 64 provided on the negative electrode current collector 62. The negative electrode active material layer 64 may be provided on only one surface of the negative electrode current collector 62, or may be provided on both surfaces of the negative electrode current collector 62, as shown in an example in the drawing. In embodiments, the negative electrode active material layer 64 is provided on both surfaces of the negative electrode current collector 62.

The negative electrode current collector 62 is foil-shaped (or sheet-shaped) in the example in the drawing, but the shape of the negative electrode current collector 62 is not limited thereto. The negative electrode current collector 62 may have various shapes such as a bar-like shape, a plate-like shape, and a mesh-like shape.

As the material of the negative electrode current collector 62, similarly to the conventional lithium secondary battery, metals having excellent conductivity (e.g., copper, nickel, titanium, and stainless steel) can be used. In embodiments, the material of the negative electrode current collector 62 is copper.

As the negative electrode current collector 62, copper foil can be used in embodiments.

The dimensions of the negative electrode current collector 62 are not particularly limited, and may be appropriately determined according to battery design. In the case where the copper foil is used as the negative electrode current collector 62, the thickness thereof is, for example, not less than 6 μm and not more than 30 μm.

The negative electrode active material layer 64 contains a negative electrode active material.

As the negative electrode active material, carbon materials such as graphite, hard carbon, and soft carbon can be used. In embodiments, graphite may be used because the effect achieved by the present teaching is higher. The graphite may be natural graphite or artificial graphite, and may also be amorphous carbon-coated graphite in which graphite is coated with an amorphous carbon material. In embodiments, amorphous carbon-coated graphite may be used as the graphite.

The average particle diameter of the negative electrode active material is not particularly limited, and may have a value substantially equal to that of the conventional lithium secondary battery. In embodiments the average particle diameter of the negative electrode active material is not more than 50 μm and not less than 1 μm, such as not more than 20 μm and not less than 5 μm, or even not more than 15 μm.

It should be noted that, in the present specification, the "average particle diameter" denotes a particle diameter (D50) having a cumulative frequency corresponding to a volume percentage of 50% in a particle size distribution measured by a laser diffraction scattering method unless otherwise specified.

In addition, the BET specific surface area of the negative electrode active material is not particularly limited, and can be not less than 1.5 m²/g, or even not less than 2.5 m²/g. On the other hand, in embodiments, the BET specific surface area is not more than 10 m²/g, or even not more than 6 m²/g.

It should be noted that, in the present specification, the "BET specific surface area" denotes a value obtained by analyzing a gas absorption measured by a gas absorption method (constant volume absorption method) which uses a nitrogen ($N_2$) gas as an absorbate by the BET method.

The content of the negative electrode active material in the negative electrode active material layer 64 (i.e., the content of the negative electrode active material with respect to the total mass of the negative electrode active material layer 64) is not particularly limited, and in embodiments is not less than 70 mass %, such as not less than 80 mass % and not more than 99.5 mass %, or even not less than 85 mass % and not more than 99 mass %.

The negative electrode active material layer 64 can contain components other than the active material such as a binder and a thickening agent.

As the binder, for example, styrene butadiene rubber (SBR) or the like can be used.

As the thickening agent, for example, carboxymethyl cellulose (CMC) or the like can be used.

The content of the binder in the negative electrode active material layer 64 is not particularly limited, and in embodiments is not less than 0.1 mass % and not more than 8 mass %, or even not less than 0.2 mass % and not more than 3 mass %.

The content of the thickening agent in the negative electrode active material layer 64 is not particularly limited, and in embodiments is not less than 0.3 mass % and not more than 3 mass %, or even not less than 0.4 mass % and not more than 2 mass %.

In the present embodiment, the negative electrode active material layer 64 contains a trace component, and the trace component is at least one element selected from the group consisting of Ti, Si, Ca, and Cr. The content of the trace component is not less than 10 mass ppm and not more than 800 mass ppm with respect to the negative electrode active material.

Thus, by allowing the negative electrode active material layer 64 to contain a specific amount of a specific trace component, it is possible to prevent an increase in resistance of a battery using the negative electrode 60 when left at a high temperature for a long period of time. In addition, it is possible to appropriately adjust the viscosity of the negative electrode paste which contains the negative electrode active material during manufacture of the negative electrode 60.

Although the reason why such an effect is obtained is uncertain, it is believed that the specific surface area of a negative electrode mixture is increased by adding the specific amount of the trace component, and resistance characteristics of a battery when left at a high temperature for a long period of time and the viscosity of the negative electrode paste are thereby improved.

It should be noted that when the content of the trace component is less than 10 mass ppm, the viscosity of the negative electrode paste during manufacture becomes excessively high.

In addition, when the content of the trace component exceeds 800 mass ppm, it becomes impossible to prevent an increase in resistance of a battery when left at a high temperature for a long period of time. This is because, when the content of the trace component is excessively high, the trace component is deposited and the resistance is thereby increased.

With regard to the trace component, the negative electrode active material layer 64 may contain a compound which contains at least one element selected from the group consisting of Ti, Si, Ca, and Cr (e.g., an oxide colloid such as a silica colloid or the like, or a hydroxide such as calcium hydroxide or the like), and the negative electrode active material layer 64 may also contain the trace component by using the negative electrode active material containing the above elements.

The content of the trace component can be determined by a known method (e.g., a fluorescent X-ray analysis method or the like).

In the present embodiment, the negative electrode active material layer 64 may be free from Al and Fe.

The thickness of the negative electrode active material layer 64 on one side of the negative electrode current collector 62 is not particularly limited, and in embodiments is not less than 40 µm, or even not less than 50 µm. On the other hand, the thickness thereof is not more than 100 µm, or even not more than 80 µm in embodiments.

In addition, the density of the negative electrode active material layer 64 is not particularly limited, and in embodiments is not less than 0.5 $g/cm^3$, or even not less than 1 $g/cm^3$. On the other hand, in embodiments, the density thereof is not more than 2.5 $g/cm^3$, or even not more than 2 $g/cm^3$.

A manufacturing method of the negative electrode 60 according to the present embodiment is not particularly limited. For example, it is possible to manufacture the negative electrode 60 by the manufacturing method of the negative electrode 60 which includes the steps of: preparing the negative electrode paste containing the negative electrode active material and the trace component; applying the negative electrode paste onto the negative electrode current collector 62; and drying the applied negative electrode paste to form the negative electrode active material layer 64, wherein the trace component is at least one element selected from the group consisting of Ti, Si, Ca, and Cr, and the content of the trace component is not less than 10 mass ppm and not more than 800 mass ppm with respect to the negative electrode active material.

The step of preparing the negative electrode paste can be performed, for example, by mixing the negative electrode active material, a compound containing the trace component, and any other components (e.g., a binder, a thickening agent, and the like) in an appropriate solvent (e.g., water or the like) according to a known method. Alternatively, the step can be performed by mixing the negative electrode active material containing the trace component, and any other components (e.g., a binder, a thickening agent, and the like) in an appropriate solvent (e.g., water or the like) according to a known method. In these operations, the trace component is allowed to be contained in an amount of not less than 10 mass ppm and not more than 800 mass ppm with respect to the negative electrode active material.

The negative electrode paste can be prepared in the manner described above, and the subsequent steps can be performed according to a known method.

According to the manufacturing method described above, the effect of appropriate adjustment of the viscosity of the negative electrode paste is obtained.

In addition, in the case where a battery is produced by using the negative electrode 60 according to the present embodiment, it is possible to prevent an increase in resistance of the battery when left at a high temperature for a long period of time.

Hereinbelow, the battery including the negative electrode 60 according to the present embodiment will be described by mentioning the lithium secondary battery as an example with reference to FIG. 2 and FIG. 3.

Figure 2:
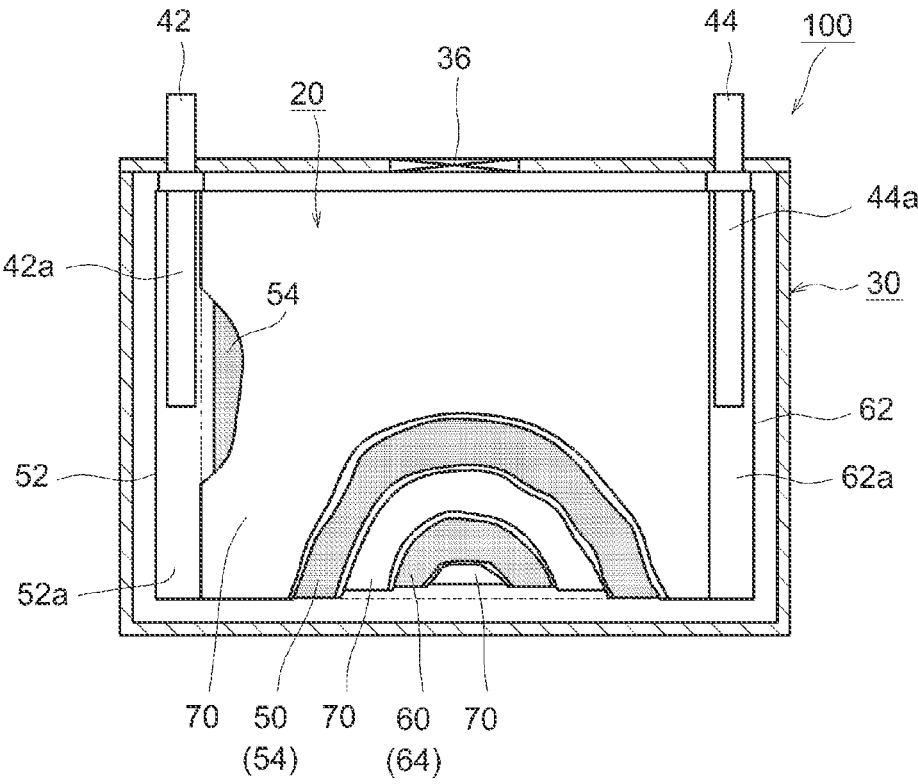
FIG. 2 is a cross-sectional view schematically showing the internal structure of a lithium secondary battery which uses the negative electrode according to the embodiment of the present teaching.

A lithium secondary battery 100 shown in FIG. 2 is a sealed lithium secondary battery 100 constructed by accommodating a flat wound electrode body 20 and a nonaqueous electrolyte solution (not shown) in a flat square battery case (i.e., an outer container) 30. The battery case 30 is provided with a positive electrode terminal 42 and a negative electrode terminal 44 for external connection, and a thin safety valve 36 which is set to release internal pressure in the case where the internal pressure in the battery case 30 rises to a level equal to or higher than a predetermined level. In addition, the battery case 30 is provided with an injection hole (not shown) for injecting the nonaqueous electrolyte solution. The positive electrode terminal 42 is electrically connected to a positive electrode current collector plate 42*a*. The negative electrode terminal 44 is electrically connected to a negative electrode current collector plate 44*a*. As the material of the battery case 30, a metal material which is light and good in thermal conductivity such as, e.g., aluminum is used.

Figure 3:
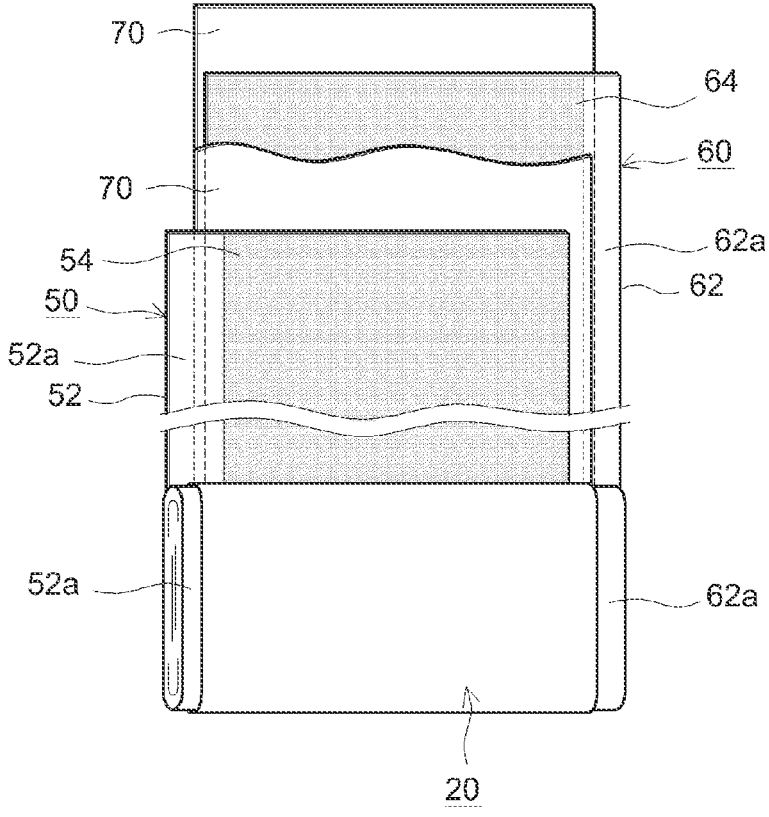
FIG. 3 is a schematic view showing the configuration of a wound electrode body of the lithium secondary battery in FIG. 2.

As shown in FIG. 2 and FIG. 3, the wound electrode body 20 has a form in which a positive electrode sheet 50 in which a positive electrode active material layer 54 is formed along a longitudinal direction on one surface or both surfaces (both surfaces in this case) of a long positive electrode current collector 52, and a negative electrode 60 sheet in which the negative electrode active material layer 64 is formed along the longitudinal direction on one surface or both surfaces (both surfaces in this case) of the long negative electrode current collector 62 are stacked via two long separator 70 sheets, and are wound in the longitudinal direction. It should be noted that the positive electrode current collector plate 42*a* and the negative electrode current collector plate 44*a* are bonded to a positive electrode active material layer non-formation portion 52*a* (i.e., a portion in which the positive electrode active material layer 54 is not formed and the positive electrode current collector 52 is exposed) and a negative electrode active material layer non-formation portion 62*a* (i.e., a portion in which the negative electrode active material layer 64 is not formed and the negative electrode current collector 62 is exposed) which are formed so as to extend outward from both ends of the wound electrode body 20 in a winding axis direction (i.e., a sheet width direction orthogonal to the above longitudinal direction), respectively.

An example of the positive electrode current collector 52 constituting the positive electrode sheet 50 includes aluminum foil or the like.

The positive electrode active material layer 54 contains a positive electrode active material. Examples of the positive electrode active material include lithium transition metal oxides (e.g., $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like), and lithium transition metal phosphate compounds (e.g., $LiFePO_4$ and the like).

The positive electrode active material layer 54 can contain a component other than the positive electrode active material such as lithium phosphate, a conductive material, and a binder. As the conductive material, for example, carbon black such as acetylene black (AB) or the like, and other carbon materials (e.g., graphite or the like) can be used suitably. As the binder, for example, polyvinylidene fluoride (PVDF) or the like can be used.

As the negative electrode sheet 60, the negative electrode 60 of the embodiment described above is used. It should be noted that, in the present configuration example, in the negative electrode sheet 60, the negative electrode active material layers 64 are formed on both surfaces of the negative electrode current collector 62.

An example of the separator 70 includes a porous sheet (film) formed of a resin such as polyethylene (PE), polypropylene (PP), polyester, cellulose, or polyamide. Such a porous sheet may have a single layer structure, or may also have a multilayer structure having two or more layers (e.g., a three-layer structure in which PP layers are stacked on both surfaces of a PE layer). A heat-resistant layer (HRL) may be provided on the surface of the separator 70.

The nonaqueous electrolyte solution contains a nonaqueous solvent and a supporting salt in embodiments.

As the nonaqueous solvent, organic solvents such as various carbonates, ethers, esters, nitriles, sulfones, and lactones which are used in the electrolyte solution of a lithium secondary battery can be used without particular limitations. Specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). Such a nonaqueous solvent can be used alone, or two or more nonaqueous solvents can be used after being combined appropriately.

As the supporting salt, a lithium salt such as $LiPF_6$, $LiBF_4$, or $LiClO_4$ can be used suitably. In embodiments, the supporting salt may be $LiPF_6$. The concentration of the supporting salt is not less than 0.7 mol/L and not more than 1.3 mol/L in embodiments.

It should be noted that the above nonaqueous electrolyte solution may contain a component other than the above-described components, for example, various additives such as a gas generating agent such as biphenyl (BP) or cyclohexylbenzene (CHB), and a thickening agent, as long as the effects of the present teaching are not significantly impaired.

The thus configured lithium secondary battery 100 can be used for various applications. An example of the application includes a drive power source mounted on a vehicle such as an electric vehicle (EV), a hybrid vehicle (HV), or a plug-in hybrid vehicle (PHV). The lithium secondary battery 100 can also be used in the form of a battery pack in which a plurality of lithium secondary batteries is connected in series and/or in parallel.

It should be noted that the square lithium secondary battery 100 including the flat wound electrode body 20 has been described as an example. However, the lithium secondary battery can also be configured as a lithium secondary battery including a stacked-type electrode body. In addition, the lithium secondary battery can also be configured as a cylindrical lithium secondary battery or a laminated lithium secondary battery.

While the negative electrode 60 according to the present embodiment is suitable as the negative electrode of the lithium secondary battery, the negative electrode 60 can also be used as electrodes of other batteries, and the other batteries can be configured according to a known method.

Hereinbelow, while examples related to the present teaching will be described, it is not intended to limit the present teaching to such examples.

Production of Negative Electrodes of Each Example and Each Comparative Example Graphite coated with an amorphous carbon material was prepared as a negative electrode active material. The graphite (C), styrene butadiene rubber (SBR) serving as a binder, and carboxymethyl cellulose (CMC) serving as a thickening agent were mixed with ion-exchanged water at a mass ratio of C:SBR:CMC=98:0.7:0.5. At this point, a compound containing an element shown in Table 1 was added such that the element satisfies a mass rate (mass ppm) shown in Table 1 with respect to the negative electrode active material. As the compound containing the element, a titanium colloid, a silica colloid, calcium hydroxide, chromium hydroxide, aluminum hydroxide, or iron hydroxide was used. A negative electrode paste was prepared by adequately stirring and mixing the mixture. The negative electrode paste was applied to both surfaces of long copper foil having a thickness of 10 μm so as to form a belt-like shape and was dried, and was then pressed, whereby negative electrode sheets of each example and each comparative example were produced.

Viscosity Measurement of Negative Electrode Paste

At the time of production of the negative electrode described above, the viscosity of the negative electrode paste immediately after the preparation was measured. In the measurement, an E-type viscometer was used, and the condition that temperature was set to 25° C. and a rotor revolution speed was set to 1 rpm was adopted. Ratios of values of the viscosities of the negative electrode pastes in each example and each comparative example in the case where the value of the viscosity serving as a reference was set to 100 were calculated. The result is shown in Table 1.

Production of Lithium Secondary Battery for Evaluation

A positive electrode paste was prepared by mixing $LiNi_{0.34}Co_{0.33}Mn_{0.33}O_2$ (LNCM) serving as a positive electrode active material, trilithium phosphate ($Li_3PO_4$), acetylene black (AB) serving as a conductive material, and polyvinylidene fluoride (PVdF) serving as a binder in N-methyl pyrrolidone (NMP) at a mass ratio of LNCM:$Li_3PO_4$:AB:PVdF=87:3:8:2. The positive electrode paste was applied to both surfaces of long aluminum foil having a thickness of 15 μm so as to form a belt-like shape and was dried, and was then pressed, whereby a positive electrode sheet was produced.

In addition, two separator sheets (porous polyolefin sheets) were prepared.

The produced positive electrode sheet, the negative electrode sheet of each of examples and comparative examples, and the prepared two separator sheets were stacked and wound, and a wound electrode body was thereby produced. Electrode terminals were attached to the positive electrode sheet and the negative electrode sheet, and the wound electrode body was accommodated in a battery case having a liquid inlet.

Subsequently, a nonaqueous electrolyte solution was injected from the liquid inlet of the battery case, and the liquid inlet was sealed airtightly. It should be noted that, as the nonaqueous electrolyte solution, a solution obtained by dissolving $LiPF_6$ serving as a supporting salt at a concentration of 1.0 mol/L in a mixed solvent containing ethylene carbonate (EC), ethyl methyl carbonate (EMC), and dimethyl carbonate (DMC) at a volume ratio of 3:4:3 was used.

In this manner, a lithium secondary battery for evaluation was obtained.

High Temperature Storage Test

Each of the produced lithium secondary batteries for evaluation was subjected to an initial charge-discharge process.

After each lithium secondary battery for evaluation was adjusted to a State of Charge (SOC) of 27%, the lithium secondary battery was left in a temperature environment of 25° C. Each lithium secondary battery for evaluation was discharged at a rate of 10 C for 10 seconds, and a resistance value was determined from a discharge curve at this point.

After each lithium secondary battery for evaluation was adjusted to a SOC of 80%, the lithium secondary battery was stored in a temperature environment of 75° C. for 180 days.

Thereafter, the resistance value was measured in the same manner as that described above, and a resistance increase rate was calculated by using the resistance values before and after the storage. A ratio of the value of the resistance increase rate of each lithium secondary battery for evaluation in the case where the value of the resistance increase rate serving as a reference was set to 100 was calculated. The result is shown in Table 1.

TABLE 1

| | Added Element (mass ppm) | | | | | | Total (mass ppm) | Resistance Increase Rate Ratio | Paste Viscosity Ratio |
|---|---|---|---|---|---|---|---|---|---|
| | Ti | Si | Ca | Cr | Al | Fe | | | |
| Comparative Example 1 | 0 | 0 | 2.5 | 0 | 0 | 0 | 2.5 | 100 | 115 |
| Example 1 | 10 | 0 | 0 | 0 | 0 | 0 | 10 | 100 | 100 |
| Example 2 | 0 | 10 | 0 | 0 | 0 | 0 | | 98 | 101 |
| Example 3 | 0 | 0 | 10 | 0 | 0 | 0 | | 101 | 100 |
| Example 4 | 0 | 0 | 0 | 10 | 0 | 0 | | 102 | 103 |
| Comparative Example 2 | 0 | 0 | 0 | 0 | 10 | 0 | | 111 | 100 |
| Comparative Example 3 | 0 | 0 | 0 | 0 | 0 | 10 | | 113 | 99 |
| Example 5 | 30 | 30 | 30 | 30 | 0 | 0 | 120 | 100 | 100 |
| Comparative Example 4 | 0 | 0 | 0 | 0 | 55 | 65 | | 110 | 98 |
| Example 6 | 800 | 0 | 0 | 0 | 0 | 0 | 800 | 102 | 102 |
| Example 7 | 0 | 800 | 0 | 0 | 0 | 0 | | 100 | 100 |
| Example 8 | 0 | 0 | 800 | 0 | 0 | 0 | | 102 | 101 |
| Example 9 | 0 | 0 | 0 | 800 | 0 | 0 | | 100 | 100 |
| Example 10 | 200 | 200 | 200 | 200 | 0 | 0 | | 99 | 103 |
| Comparative Example 5 | 0 | 0 | 0 | 0 | 450 | 350 | | 114 | 99 |
| Comparative Example 6 | 300 | 300 | 300 | 300 | 0 | 0 | 1200 | 122 | 101 |

As can be seen from Table 1, in Examples 1 to 10 in which at least one element selected from the group consisting of Ti, Si, Ca, and Cr is contained in a range of not less than 10 mass ppm and not more than 800 mass ppm with respect to the negative electrode active material, it is found that the viscosity of the negative electrode paste is low, and an increase in resistance of the battery using the negative electrode after storing at a high temperature is small.

Consequently, it is found that, according to the negative electrode disclosed herein, it is possible to appropriately adjust the viscosity of the negative electrode paste containing the negative electrode active material during manufacture of the negative electrode, and prevent an increase in resistance of the battery using the negative electrode when left at a high temperature for a long period of time.

Although the specific examples of the present teaching have been described above in detail, these are merely examples and do not limit the scope of the claims. The art set forth in the claims includes various changes and modifications of the specific examples illustrated above.

What is claimed is:

1. A method for manufacturing a lithium secondary battery, the method comprising:

preparing a negative electrode by:
  preparing a negative electrode paste containing a negative electrode active material, a binder, and a trace component;
  applying the negative electrode paste onto a negative electrode current collector; and
  drying the negative electrode paste to form a negative electrode active material layer, wherein:
  the negative electrode active material consists of graphite or graphite coated with an amorphous carbon material;
  the binder comprises styrene butadiene rubber,
  the trace component is at least one element selected from the group consisting of Ti, Si, Ca, and Cr, wherein the trace component comprises Si, Ti, and Cr,
  a content of the Si is not less than 30 mass ppm and not more than 200 mass ppm with respect to the negative electrode active material,
  a content of the Ti is more than 0 mass ppm and not more than 200 mass ppm with respect to the negative electrode active material,
  a content of the Cr is more than 0 mass ppm and not more than 200 mass ppm with respect to the negative electrode active material, and
  a content of the trace component is not less than 120 mass ppm and not more than 800 mass ppm with respect to the negative electrode active material;
preparing an electrode body comprising:
  the negative electrode;
  a positive electrode; and
  a separator positioned between the negative electrode and the positive electrode; and
providing the electrode body and a nonaqueous electrolyte solution into a battery case, wherein the nonaqueous electrolyte solution comprises a nonaqueous solvent that comprises at least 30% by volume ethylene carbonate.

2. The method according to claim 1, wherein the nonaqueous solvent further comprises ethyl methyl carbonate.

3. The method according to claim 2, wherein a volume content of the ethyl methyl carbonate in the nonaqueous solvent is larger than a volume content of the ethylene carbonate in the nonaqueous solvent.

4. A method for manufacturing a lithium secondary battery, the method comprising:

preparing a negative electrode by:

preparing a negative electrode paste containing a negative electrode active material, a binder, and a trace component;

applying the negative electrode paste onto a negative electrode current collector; and drying the negative electrode paste to form a negative electrode active material layer, wherein the negative electrode active material consists of graphite or graphite coated with an amorphous carbon material;

the binder comprises styrene butadiene rubber, the trace component is at least one element selected from the group consisting of Ti, Si, Ca, and Cr, wherein the trace component comprises Si, a content of the Si is not less than 30 mass ppm and not more than 200 mass ppm with respect to the negative electrode active material, and a content of the trace component is not less than 120 mass ppm and not more than 800 mass ppm with respect to the negative electrode active material;

preparing an electrode body comprising:

the negative electrode;

a positive electrode; and a separator positioned between the negative electrode and the positive electrode; and providing the electrode body and a nonaqueous electrolyte solution into a battery case, wherein the nonaqueous electrolyte solution comprises a nonaqueous solvent and a supporting salt, and wherein the nonaqueous solvent consists of carbonates including at least 30% by volume ethylene carbonate.

5. The method according to claim 4, wherein the nonaqueous solvent further comprises ethyl methyl carbonate.

6. The method according to claim 5, wherein a volume content of the ethyl methyl carbonate in the nonaqueous solvent is larger than a volume content of the ethylene carbonate in the nonaqueous solvent.

\* \* \* \* \*